Inventor
E. J. Gargini
By Glascock Downing & Seebold
Attys.

Inventor
E. J. Gargini
By Glascock Downing & Seebold
Attys.

Inventor
E. J. Gargini
By Mascock Downing & Seebold
Attys.

United States Patent Office 2,923,765

Patented Feb. 2, 1960

2,923,765

AMPLITUDE AND PHASE MODULATION OF SINGLE CARRIER BY BRIGHTNESS AND COLOR SIGNALS

Eric John Gargini, Yiewsley, West Drayton, England, assignor to Electric & Musical Industries Limited, Hayes, England, a company of Great Britain Application June 18, 1957, Serial No. 666,422

Claims priority, application Great Britain June 21, 1956

9 Claims. (Cl. 178—5.2)

This invention relates to colour television.

There have been many proposals for different colour television systems, one of these being the so-called N.T.S.C. system. Each of these different systems has disadvantages, for example in the afore-mentioned N.T.S.C. system, to distinguish between the two colour signals, one phase of the chrominance sub-carrier must be fully doubleside band modulated, which means that the chrominance subcarrier frequency must be well within the luminance band, thus giving rise to a number of effects which lower the picture quality, one of these being cross talk. Even when modified in practice so that the colour information is transmitted outside the luminance band there is a resultant loss of resolution both on colour and monochrome reception if the overall bandwidth is subject to limitation.

The object of the present invention is to provide an improved method of generating colour television signals and improved colour television transmitting and receiving apparatus.

According to the present invention there is provided a method of generating colour television signals wherein a first carrier wave is amplitude modulated by a brightness signal and angle modulated by at least part of a first colour information signal and a second carrier wave is modulated by a second colour information signal said second carrier wave being spaced from said first carrier wave.

Also, according to the present invention there is provided a colour television transmitter comprising means for generating a brightness signal, means for generating two colour information signals, means for amplitude modulating a first carrier wave in response to said brightness signal, means for angle modulating said first carrier wave in response to at least part of a first one of said two colour information signals and means for modulating a second carrier wave in response to the second one of said two colour information signals, said second carrier wave being spaced from said first carrier wave.

In one feature of the present invention colour information is represented by hue and saturation variations and according to this feature of the present invention there is provided a colour television system wherein colour television signals comprise a vestigial side-band brightness signal, the brightness carrier wave being phase modulated by hue variations and a sub-carrier modulated by saturation variations, said sub-carrier being substantially at one extremity of the frequency spectrum associated with said brightness carrier wave.

Figure 1:
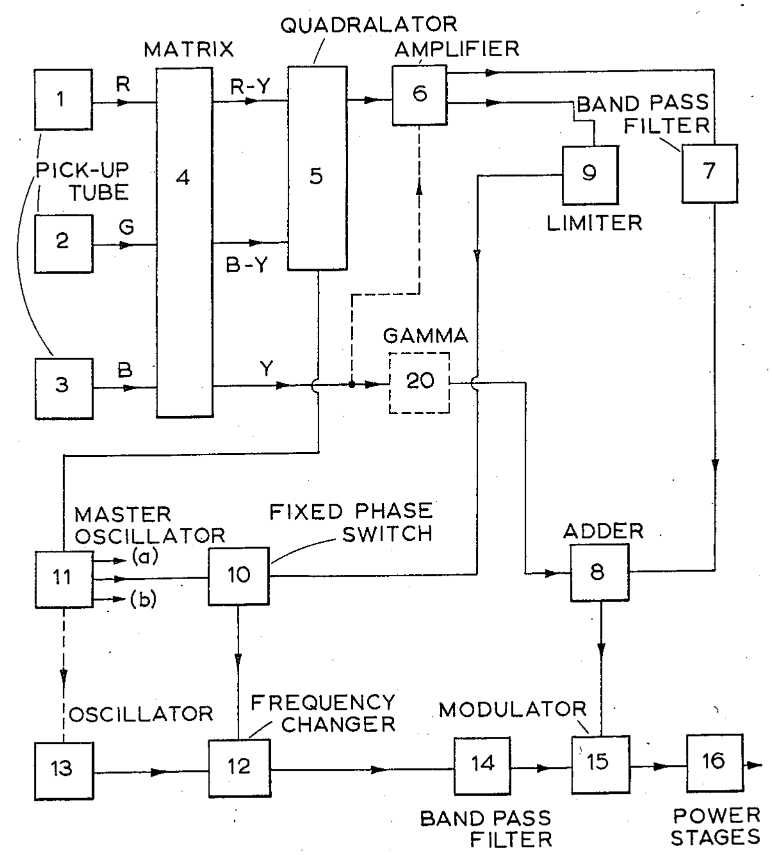
Figure 1A:
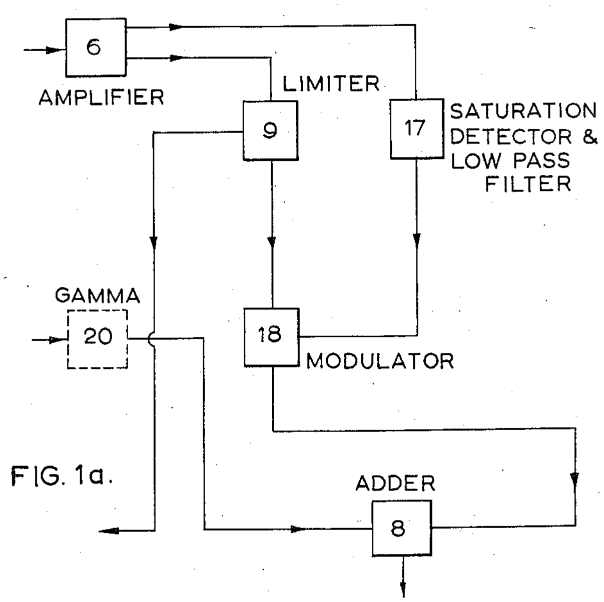
Figure 1B:
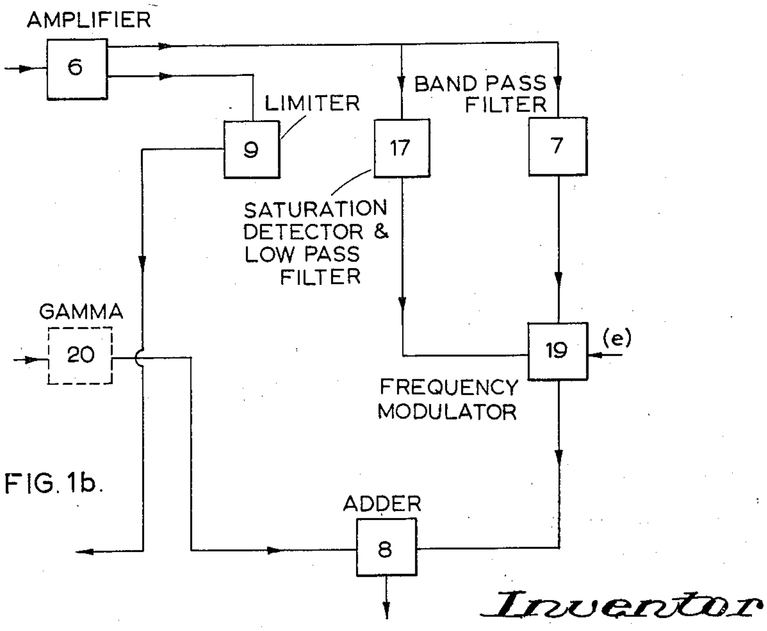
Figure 2:
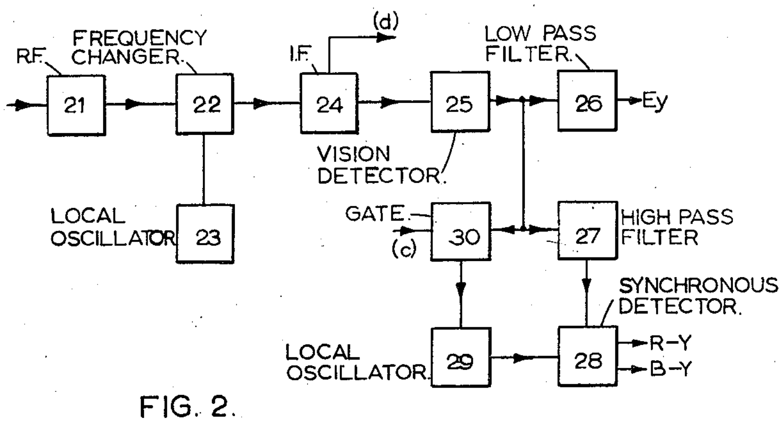
Figure 3:
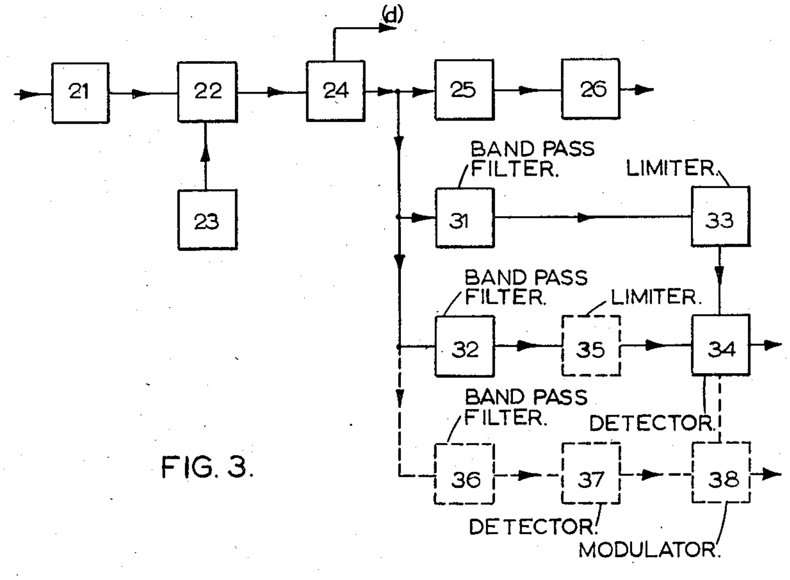

In order that the invention may be clearly understood and readily carried into effect, the invention will be described with reference to the figures of the accompanying drawings enumerated as 1, 1*a* and 1*b* for convenience, in which:

Figure 1 illustrates in schematic form a transmitter for generating colour television signals according to the present invention and Figures 1*a* and 1*b* illustrate modifications of Figure 1, also Figures 2 and 3 of the accompanying drawings which similarly illustrate receivers for receiving signals such as generated by the transmitter of Figure 1 are referred to.

References 1, 2 and 3 of Figure 1 are R, G and B pick-up tubes (R, G and B having the usual significance) the outputs of which are applied to a matrix unit 4, incorporating gamma stages, wherein the signals R—Y, B—Y and Y are derived in known manner, Y representing luminosity in the usual manner. The R—Y and B—Y signals are applied to a so-called quadralator 5 wherein a chrominance signal is derived in similar manner to that employed in the N.T.S.C. system by amplitude modulating two carrier waves of frequency $f$ mc./s., say, in phase quadrature relationship. This chrominance signal may be represented as $E_s \cos(2\pi mft+\phi)$ where $E_s$ represents the amplitude and $\phi$ the phase of the signal, respectively, and $m=10^6$. The chrominance signal is fed to an amplifier 6 having two outputs, one of which is fed to a band pass filter 7 of pass band $f\pm1.5$ mc./s., say, which has output $E_s \cos(2\pi mft+\phi)$ applied to an adder 8 together with the Y signal output represented by $E_Y$ from the matrix unit 4. The signal derived from the adder 8 is then $E_y+E_s \cos(2\pi mft+\phi)$.

The second output from the amplifier 6 is fed to an amplitude limiter 9 so that the output of the limiter 9 comprises only the phase variations $\cos(2\pi mft+\phi)$, which variations are fed to a fixed phase switch 10 together with an output from a master oscillator 11 of $f$ mc./s., say. The oscillator 11 also has an output applied to the quadralator 5 and provides two outputs (*a*) and (*b*) for synchronising generation of line and frame synchronising pulses, respectively. The phase switch 10 may comprise a "flip-flop" circuit so triggered when the output of the limiter 9 falls substantially to zero that the output of oscillator 11 is switched in. Thus the phase variations from the limiter 9 are represented by the phase variations of a steady carrier wave of $f$ mc./s., say, a datum level for the phase variations being fixed as that of the output of the oscillator 11 for the case of no chrominance information and also for colour burst signals. Alternatively, a phase modulator arrangement such as described in co-pending British patent application No. 3,214/57 may be employed instead of the fixed phase switch arrangement. The output of the phase switch 10 is $\cos(2\pi mft+\phi)$ and is fed to a frequency changer 12, a second input of which is from an oscillator 13 of frequency equal to that of the desired luminance carrier wave, *F Mc./s.* say, minus the carrier frequency, $f$ mc./s., that is $(F—f)$ mc./s.

The resultant output of the frequency changer 12 is $\cos(2\pi mFt+\phi)$ and is fed via a band pass filter 14 of response equivalent to the filter 7, but centred at F mc./s. instead of $f$ mc./s., to a modulator 15 wherein it is modulated by the output $E_y+E_s \cos(2\pi mft+\phi)$ from the adder 8. The output of the modulator 15 comprises $E_y \cos(2\pi mFt+\phi)$, $E_s \cos(2\pi m\overline{F-f}.t)$ and $E_s \cos(2\pi m\overline{F+f}.t+2\phi)$. These signals are fed to the power stages and aerial unit represented by a single block 16, which block also incorporates a filter to block the last of the above signals, thus leaving an output comprising a carrier wave of frequency F mc./s. amplitude modulated by the luminance variations and phase modulated by the phase variations of the chrominance signal and a sub-carrier of frequency $(F—f)$ mc./s. amplitude modulated by the amplitude variations of the chrominance signal. In practice the last-mentioned amplitude modulation need only be a vestigial sideband modulation as is also usually the case for the luminance modulation, however, the vestigial side-band must be sufficient to include the phase variations of the chrominance signal as a double side-band modulation as will be apparent hereinafter for the purpose of receiving the transmitted colour television signals.

Also in the above example, the luminance signal $E_Y$ may be replaced by an equi-energy intensity signal, $$E_E=\frac{1}{3}$$

$(E_R+E_G+E_B)$, and the expression "brightness" used herein is intended to include signals representing luminosity, $E_Y$, and equi-energy intensity, $E_E$.

In another arrangement of the above example X, Y and Z pick-up tubes may be employed (X and Z having the usual significance) instead of R, G and B pick-up tubes.

In a preferred feature of the present invention the colour information is represented by the chromaticity signals $$\frac{R}{Y}-1 \text{ and } \frac{B}{Y}-1$$

which, when combined as before, result in a signal whose phase and amplitude are representative of hue and saturation variations, respectively. This has the advantage as described in the specification of co-pending United States application Serial No. 651,707 which include simplification of reception. The transmitter of Figure 1 can be modified to represent the colour information as a chromaticity signal by removing the gamma stages from the matrix unit 4 and placing them in the Y signal output lead as a separate unit 20, shown in dotted outline. A further Y signal output, also shown in dotted outline, is fed to amplifier 6, which in this case also comprises a divider for use in the derivation of the combined chromaticity signal. This chromaticity signal may be derived as described in the afore-mentioned patent application.

In this latter case the associated luminance signal may also be replaced by an equi-energy intensity signal. Similarly, the Y of the chromaticity signals may also be replaced by an equi-energy intensity signal.

The amplifier and divider 6 may consist essentially of two valves, both having two control electrodes which for convenience will be referred to as the control grid and the suppressor grid respectively. The Y signal is applied to the control grid of one of these valves, and a negative feedback connection is provided from the anode to the suppressor grid which operates to keep the anode current in the valve sensibly constant. This implies that the voltage variations at the suppressor grid must represent $1/Y$. The $R-Y$ (or $B-Y$ signal, as the case may be) is applied to the control grid of the second valve and the voltage representing $1/Y$ is applied to the suppressor grid thereof. The resultant anode current variations then represent $$\frac{R}{Y}-1$$

as required.

Hereinafter the phase and amplitude variations of the colour signal will be referred to as hue and saturation variations, respectively, as for chromaticity signals, $$\frac{R}{Y}-1 \text{ and } \frac{B}{Y}-1$$

but a chrominance, or other signals as described, may also be employed in similar manner.

If only a narrow band saturation signal is required, then, as shown in Figure 1*a*, the path through the filter 7 is replaced by a saturation detector and low pass filter 17 the output $e_s$ say, of which is caused to modulate an additional output from the limiter 9 in a modulator 18, thus generating a chromaticity signal $e_s \cos(2\pi mft+\phi)$ having a wide band hue variation and narrow band saturation variation, which signal is fed to the adder 8 as before.

In the case of narrow band saturation representation just described, the total pass band of the filter 14 may be made numerically equal to that of the filter 7 for the case of wide band saturation minus that of the filter 17 for the case of narrow band saturation. Thus, if in this case $\phi_h$ and $\phi_1$ represent the high and low frequency values of the hue variations, respectively, the output of the filter 17 is $e_s \cos(2\pi mft+\phi_h+\phi_1)$ as before, but the output of the filter 14 is $\cos(2\pi mFt+\phi_h)$, the low frequency values of the hue variations being effectively defined in the case of a hue transient by the band width of the filter 14. The output of the modulator 15 then comprises $E_y \cos(2\pi mFt+\phi_h)$, $$e_s(2\pi f\overline{F-f}.t-\phi_1)$$

and $e_s \cos(2\pi m\overline{F=f}.t+2\phi_h+\phi_1)$, the latter signal being blocked as before. Thus, the high and low frequency values of the phase variations are phase modulated onto the luminance carrier wave and saturation sub-carrier wave, respectively. The hue variations may only be represented by a "split" band in the above described case of narrow band saturation representation, since this narrow band is a double sideband modulation of the same band width as the low frequency values of the hue variations modulated on the saturation sub-carrier wave and there is substantially no interference caused by either one or the other.

In a further modification of the transmitter of Figure 1 the sound carrier wave, which carrier wave is usually situated substantially at one extremity of the luminance carrier frequency spectrum, is used as the saturation sub-carrier wave of $(F-f)$ mc./s. This is done by injecting the sound signal at (*e*), as shown in Figure 1*b*, so as to frequency modulate the chromaticity signal from the filter 17 in a frequency modulator 19. In this case the saturation signal is increased by a constant bias so that in the absence of saturation the sound signal has a datum level on detection. Alternatively, the sound carrier wave, frequency modulated by sound signals, can be amplitude modulated by the saturation information. Clearly this modification employing the sound carrier wave cannot be applied to the case where the low frequency hue variations are transmitted as phase modulation of the sub-carrier wave.

In a still further modification of Figure 1, if the frequency of the oscillator 13, $(F-f)$ mc./s., is a multiple of the master oscillator 11 frequency, $f$ mc./s., (then also the luminance carrier wave frequency F mc./s. is a multiple of $f$ mc./s.) a frequency lock is employed between the oscillators 11 and 13, as represented by a dotted line in Figure 1. If this is so it is possible to take advantage of the absolute relationship between the frequencies of the luminance and sub-carrier waves at a receiver in so far as synchronous detection with locked local oscillator operation is practicable.

Figure 2 illustrates a receiver for receiving signals such as generated by the transmitter of Figure 1 with narrow band saturation. Reference 21 represents the radial frequency stages which select and amplify the desired signals from the transmitter. These signals are fed to a frequency changer 22 together with the output from a local oscillator 23 of frequency $f_0$ mc./s., say, thus generating intermediate frequency signals which are amplified in the intermediate frequency stages represented by the block 24. The intermediate frequency signals are applied to a vision detector 25 which is of conventional type and results in the hue variations being transferred to the sub-carrier wave so that the output of the detector 25 comprises $E_y$ and $E_s$ $(\cos 2\pi kf.t+\theta)$, that is, the luminance signal and a sub-carrier wave of frequency $f$ mc./s., say, amplitude modulated by saturation variations and phase modulated by hue variations, which latter signal is the required chromaticity signal. The luminance signal is selected by a low pass filter 26 and the sub-carrier wave passed by a high pass filter 27 to a synchronous detector 28 which operates in known manner to derive the signals $$\frac{R}{Y}-1 \text{ and } \frac{B}{Y}-1 \text{ (or } R-Y$$

and $B-Y$ if a chrominance signals is used at the transmitter). The detector 28 operates in conjunction with a further local oscillator 29 of frequency $f$ mc./s., say, which oscillator 29 is synchronised by colour bursts via a gate 30 having an input from the vision detector 25, this input being gated under the control of synchronising pulses (*c*). The high pass filter 27 operates such that the resultant chromaticity signal comprises narrow band saturation variations and wide band hue variations, which is similar to the wide band widths of the phase and amplitude variations of signals obtained in present high quality N.T.S.C. system receivers (more similar in the case of chrominance), but with the advantage that no band limiting filters are required after synchronous detection. A second output (*d*) from the intermediate frequency stages 24 is utilised for deriving the sound signal.

Figure 3 illustrates an improved version of the receiver of Figure 2 for receiving transmissions containing vestigial sideband or narrow band saturation signals which receiver comprises radio frequency stages 21, frequency changer 22, local oscillator 23 and intermediate frequency stages 24 as before. The sound signal is derived from an output (*d*) from the intermediate frequency stages 24 and the luminance signal via a vision detector 25 and low pass filter 26 from a further output of the intermediate frequency stages 24, as described above with reference to Figure 2.

A still further output from the intermediate frequency stages 24 is fed in parallel to band pass filters 31 and 32 of which filter 31 passes the hue variation band of 3 mc./s., say, centred at $(F-f_0)$ mc./s. to a limiter 33 and filter 32 passes a narrow band saturation signal centred at $(F-f-f_0)$mc./s. The outputs of the limiter 33 and the filter 32 are fed to a further detector 34 from which is derived the chromaticity (or chrominance) signal as from the high pass filter 27 of Figure 2, this signal being detected as in that case.

The advantage of the different derivation of the chromaticity (or chrominance) signal is that luminance transients affecting the hue variations are substantially eliminated by the use of the limiter 33. This may equally well be applied to receivers for receiving N.T.S.C. system signals to some advantage. Also the vestigial sideband saturation signal may be received, since it is limited to a narrow double-side band signal by filter 32, before the chromaticity (or chrominance) signal is derived.

A further and preferred version of the basic receiver of Figure 2 will now be described with the aid of Figure 3 together with the additional dotted outline blocks. This receiver may be used in the case of frequency modulated sound transmissions on the saturation sub-carrier wave. In Figure 3 a further amplitude limiter 35 is placed between the filter 32, which includes a flywheel phase lock oscillator locked at the sub-carrier wave intermediate frequency since the sound frequency modulation is double side-band in the case of frequency modulation sound transmissions, and detector 34, so that the output of the detector 34 will be the hue variations only, phase modulated onto the difference frequency of the luminance carrier wave and saturation sub-carrier wave (in fact the difference of the respective intermediate frequencies) due to the action of the detector 34. Also a series combination of a band pass filter 36 and detector 37 is fed in parallel with the filters 31 and 32, the filter 36 having a response such that the full saturation modulation (and an additional constant signal in the case of frequency modulated sound) is recovered and on detection in the detector 37 gives rise to a saturation signal such as would be derived from a wide band saturation signal. The outputs of the detectors 34 and 37 are applied to a modulator 38 thus generating a wide band hue and saturation chromaticity signal which may be synchronously detected in known manner, the modulator bias being adjusted to suppress the additional signal arising in the case of frequency modulation sound. Similarly a wide band phase and amplitude variation chrominance signal may be derived.

In colour television signals according to the present invention the signal representative of colour information which is modulated onto the sub-carrier wave may be more suitably placed with respect to the luminance carrier wave so as to avoid creating a dot pattern on a received picture without removing the sub-carrier wave from the luminance band, which removal results in loss of resolution if the total bandwidth available is limited. This is made possible by modulating the sub-carrier wave double side-band with a component of colour information which only requires a narrow band for adequate representation. The sub-carrier can of course be modulated single or vestigial side-band with a side-band with a band width of 1 mc./s. to 1.5 mc./s. say. The sub-carrier wave may be placed substantially at the extremity of either side-band of the luminance carrier but if one is a vestigial side-band it is preferably placed furthest from the luminance carrier.

In a colour or monochrome television receiver having a response characteristic of the kind in which the response is about 6 dB down at the luminance carrier frequency, compared with the response over the major part of one side band, some cross-talk will be experienced between the hue and brightness signals when hue transients occur. This effect may be rendered substantially inoccuous by suitably predistorting the brightness signal at the transmitter and by choosing a particular direction of the rotation of phase.

If chromaticity signals are employed at the transmitter then transmissions may be received by receivers comprising single gun types of tubes since in principle such tubes have independent controls for brightness and colour. For example, if the tube has a fluorescent screen composed of vertical strips of phosphor emitting the three colours R, G and B, respectively, the colour reproduction can be achieved by velocity modulating the line scan waveform in response to the chromaticity signals as described in co-pending United States application Serial Number 651,707.

Moreover, if the colour information takes the form of chromaticity signals, as described in the afore-mentioned co-pending application, it may be advantageous to replace the normal luminance signal, the so-called Y signal of the N.T.S.C. system, by a luminance signal composed of equal proportions of R, G and B as aforementioned.

What I claim is:

1. A colour television transmitter comprising means for generating a brightness signal, means for generating two colour information signals, means for amplitude modulating a first carrier wave in response to said brightness signal, means for phase modulating said first carrier wave in response to at least part of a first one of said two colour information signals and means for modulating an oscillation in response to the second one of said two colour information signals, the frequency of said oscillation being spaced from the frequency of said first carrier wave the side band components of said carrier wave due to phase modulation thereof falling substantially within a frequency band in which both side bands due to the amplitude modulation of said carrier wave are present and means for transmitting said carrier wave and the side band components due to modulation thereof together with the side band components due to modulation of said oscillation.

2. A transmitter according to claim 1 wherein said first colour information signal is representative of hue variations and said second colour information signal is representative of saturation variations.

3. A transmitter according to claim 1, wherein said means for amplitude modulating said carrier wave in response to said brightness signal generates a vestigial sideband brightness signal and the side band components due to the amplitude modulation of said oscillation being located substantially at the extremity of the frequency spectrum associated with said carrier wave remote from the vestigial side band.

4. A transmitter according to claim 1, wherein said oscillation is amplitude modulated in response to said second colour information signal and angle modulated in response to part of said first colour information signal.

5. A transmitter according to claim 4 wherein said carrier wave is modulated in response to high frequency components of said first colour information signal and said oscillation is modulated in response to low frequency components of said first colour information signal.

6. A transmitter according to claim 1, comprising means for angle modulating said oscillation in response to a sound signal.

7. A colour television receiver for receiving signals from a transmitter according to claim 4 comprising first detector means for detecting said brightness signal, filter and limiting means responsive to said first carrier wave for selecting signals representative of said first colour information, second filter means responsive to the side band components by modulating said oscillation for selecting signals representative of said second colour information, second detector means responsive to said first filter and limiter and said second filter for detecting said second colour information and third detector means responsive to said second detector for synchronously detecting said colour information signals.

8. A colour television receiver for receiving signals from a transmitter according to claim 6 comprising first detector means for detecting said brightness signal, first filter and limiting means responsive to said first carrier wave for selecting signals representative of said first colour information, second filter means responsive to the side band components derived by modulating said oscillation for selecting signals representative of said second colour information, second detector means responsive to said first filter and limiting means for detecting said first colour information signal, third detector means for detecting said second colour information signal, modulator means responsive to said second and third detectors for generating a composite signal representative of said two colour information signals and fourth detector means for synchronously detecting said two colour information signals.

9. A colour television transmitter comprising means for generating a brightness signal, means for generating two colour information signals one of said colour information signals being relatively wide band and the other of said colour information signals being relatively narrow band, means for amplitude modulating a carrier wave in response to said brightness signal, means for phase modulating said carrier wave in response to said relatively wide band colour information signal and means for amplitude modulating an oscillation in response to said relatively narrow band colour information signal, and means for transmitting said carrier wave and the side band components due to modulation thereof together with the side band components due to modulation of said oscillation, said latter side band components being spaced in frequency from said carrier wave, the side bands of said carrier wave due to phase modulation thereof falling substantially within a frequency band in which both side bands due to the amplitude modulation of said carrier wave are present.

References Cited in the file of this patent

UNITED STATES PATENTS

| | | |
|---|---|---|
| 2,810,780 | Loughlin | Oct. 22, 1957 |
| 2,811,577 | Luck | Oct. 29, 1957 |